(12) United States Patent
Blankenbeckler et al.

(10) Patent No.: US 7,016,294 B2
(45) Date of Patent: Mar. 21, 2006

(54) INNER REGION IDENTIFIER FOR OPTICAL DISK

(75) Inventors: David L. Blankenbeckler, Longmont, CO (US); Brian S. Medower, Boulder, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 401 days.

(21) Appl. No.: 10/106,475

(22) Filed: Mar. 25, 2002

(65) Prior Publication Data

US 2003/0179688 A1 Sep. 25, 2003

(51) Int. Cl.
*G11B 7/24* (2006.01)

(52) U.S. Cl. .................................. 369/275.3
(58) Field of Classification Search ............ 369/30.04, 369/47.14, 53.12, 53.15, 53.2, 53.21, 53.22, 369/53.35, 53.41, 59.23, 59.25, 124.07, 275.3, 369/275.4, 277, 278
See application file for complete search history.

(56) References Cited

U.S. PATENT DOCUMENTS

| | | | |
|---|---|---|---|
| 4,606,018 A | 8/1986 | Sugiki et al. ............... 369/279 |
| 4,961,077 A | 10/1990 | Wilson et al. ............... 346/1.1 |
| 4,983,815 A * | 1/1991 | Kumasaka ................... 235/376 |
| 5,541,904 A | 7/1996 | Fite et al. |
| 5,703,858 A * | 12/1997 | Mitchell et al. ......... 369/53.21 |
| 5,706,266 A * | 1/1998 | Brownstein et al. ...... 369/53.21 |
| 5,761,301 A * | 6/1998 | Oshima et al. ............... 705/57 |
| 6,052,465 A | 4/2000 | Gotoh et al. ................... 380/4 |
| 6,751,173 B1 * | 6/2004 | Maeda ..................... 369/47.31 |
| 6,775,215 B1 * | 8/2004 | Kobayashi et al. ...... 369/53.21 |

* cited by examiner

*Primary Examiner*—Paul W. Huber
(74) *Attorney, Agent, or Firm*—Jonathan W. Hallman; MacPherson Kwok Chen & Heid

(57) ABSTRACT

A first surface optical disk is disclosed that has machine readable code information, such as bar code information, disposed thereon to permit a disk drive or other device to obtain certain basic information regarding the disk in an efficient and reliable manner. The machine readable code may include error detection and error correction code to correct errors, such as those caused by surface dust, that may arise during reading the machine readable code. The machine readable code may be disposed within a portion of a ring on the optical disk. Human readable alphanumeric characters, including graphics, identifying the side of the optical disk and other basic information may also be disposed within the ring.

23 Claims, 3 Drawing Sheets

| | | Resync<br>1 byte | Bar Code Data<br>4 bytes | | | |
|---|---|---|---|---|---|---|
| | | | | PLL0 | PLL1 | PLL sync-2 bytes ~302 |
| | SB_BAR | PR_0 | PR_1 | PR_2 | PR_3 | 1 Row preamble ~304 |
| | RS_BAR1 | I_0 | I_1 | I_2 | I_3 | |
| | RS_BAR1 | I_4 | I_5 | I_6 | I_7 | ~310 |
| | RS_BAR1 | I_8 | I_9 | I_10 | I_11 | |
| | RS_BAR1 | I_12 | I_13 | I_14 | I_15 | 7 Rows information |
| | RS_BAR2 | I_16 | I_17 | I_18 | I_19 | |
| | RS_BAR2 | I_20 | I_21 | I_22 | I_23 | |
| | RS_BAR2 | I_24 | I_25 | I_26 | I_27 | |
| | RS_BAR2 | D_0 | D_1 | D_2 | D_3 | 1 Row EDC ~312 |
| | RS_BAR13 | C_{0,0} | C_{1,0} | C_{2,0} | C_{3,0} | |
| | RS_BAR13 | C_{0,1} | C_{1,1} | C_{2,1} | C_{3,1} | 4 Rows ECC ~314 |
| | RS_BAR13 | C_{0,2} | C_{1,2} | C_{2,2} | C_{3,2} | |
| | RS_BAR13 | C_{0,3} | C_{1,3} | C_{2,3} | C_{3,3} | |
| | RS_BAR14 | PO_0 | PO_1 | PO_2 | PO_3 | 1 Row Postamble |
| | RS_BAR15 | | | | | ~308 |

INNER REGION IDENTIFIER FOR OPTICAL DISK

TECHNICAL FIELD

The present invention relates to optical disks, and more particularly to an inner region identifier for an optical disk.

BACKGROUND

Optical disks are used to store data and are normally designed for use with a specific type of disk drive with which the disks are compatible. When a user inserts an optical disk into a disk drive with which the optical disk is compatible, the optical disk reads electronically coded data on the optical disk to obtain instructions and information regarding writing data to and/or reading data from the optical disk.

However, when a user inserts an optical disk into a disk drive with which the optical disk is incompatible, there can be problems. The disk drive may not be able to track the incompatible optical disk or may employ a different wavelength laser than is necessary to read the electronically coded data stored on the optical disk. Another reason a disk drive may not be able to track the incompatible disk is that the disk drive may be configured to read one generation of optical disk and the inserted optical disk is of another product generation, but is of the same form factor, or size. In situations such as these, the disk drive may not receive the necessary instructions from the optical disk to read data from or write data to the optical disk.

Additionally, information regarding the optical disk may need to be read from the optical disk at different locations along optical disk manufacturing and distribution channels. This information may include logistic or security information relating to the optical disk. If the information is stored on the optical disk as electrically coded data, the optical disk must be inserted into a compatible disk drive and spun to read this information. In this case, compatible disk drives must be provided at the various locations along the distribution and manufacturing channels where the information is to be read from the optical disk. The provision of such disk drives may be expensive. Moreover, having to insert each optical disk into a disk drive to obtain this basic information therefrom may be cumbersome, and time consuming.

The following U.S. patents disclose information relating to the disposition of markings on optical disks: U.S. Pat. No. 4,961,077, U.S. Pat. No. 5,541,904, and U.S. Pat. No. 6,052,465, all of which are hereby incorporated by reference in their respective entireties.

SUMMARY

A need exists, therefore, for an optical disk having machine readable code disposed thereon that can be machine read efficiently and reliably by a variety of devices. An additional need exists for an optical disk having human readable information disposed thereon indicating the side of the optical disk and the source of the optical disk.

Accordingly, an optical disk having first and second sides is provided with an annular region on the first side disposed between a first radial distance and a second radial distance from a center of the optical disk. Optionally, annular regions are disposed on both the first and second sides. Machine readable code, such as bar code information, is disposed in a circumferential direction within a first portion of the annular region. The machine readable code includes a plurality of bars, or low reflectance stripes, each extending in a radial direction. In addition, a first set of alphanumeric characters is disposed in a circumferential direction within a second portion of the annular region to indicate the side of the disk and master source identification information. Further, a second set of alphanumeric characters is disposed in a circumferential direction within a third portion of the annular region to indicate master tape and master cut information.

The machine readable code may include error detection and error correction code for the detection and correction of errors in the machine readable code as the machine readable code is read.

Upon receiving an inserted optical disk, a disk drive spins the optical disk and advances an optical head of the disk drive to a predetermined position within the annular region containing the machine readable code. Then, using an active focus servo, the optical head focuses and reads the machine readable code with the optical head. In one embodiment, the optical head focuses and reads the machine readable code without requiring an active tracking servo since tracking along a track following mechanism such as a groove is not required. Other devices, such as bar code readers and optical scanners, may alternatively be used to read the machine readable code with or without spinning the optical disk. Moreover, the machine readable code is also readable by devices that use different track pitches. Optical scanners and image recognition systems may also be used to read human readable characters disposed within the annular region.

Thus, according to the present invention, when the optical disk is inserted into a disk drive, the disk drive reads the machine readable code to obtain information regarding the source, format, manufacturing, and mastering of the optical disk. The machine readable code is designed to be read over a wide range of wavelengths and numerical apertures. Hence, a disk drive may read the machine readable code regardless of whether the optical disk is of a same product generation as the disk drive and whether the disk drive is capable of reading information from a data zone outside of the annular region of the optical disk.

The disk drive may read the machine readable code even if the optical disk and the disk drive are incompatible in such parameters as level of firmware, code, laser properties, spin speed, and the like. This allows suitable action to be taken by the disk drive even if the optical disk is incompatible with the disk drive. For example, the disk drive may execute a controlled ejection of the optical disk and present an error message to the user indicating insertion of an incompatible optical disk.

These and other features and advantages associated with embodiments of the present invention will be apparent to those skilled in the art from the following detailed description and accompanying drawings.

DETAILED DESCRIPTION

Figure 1:
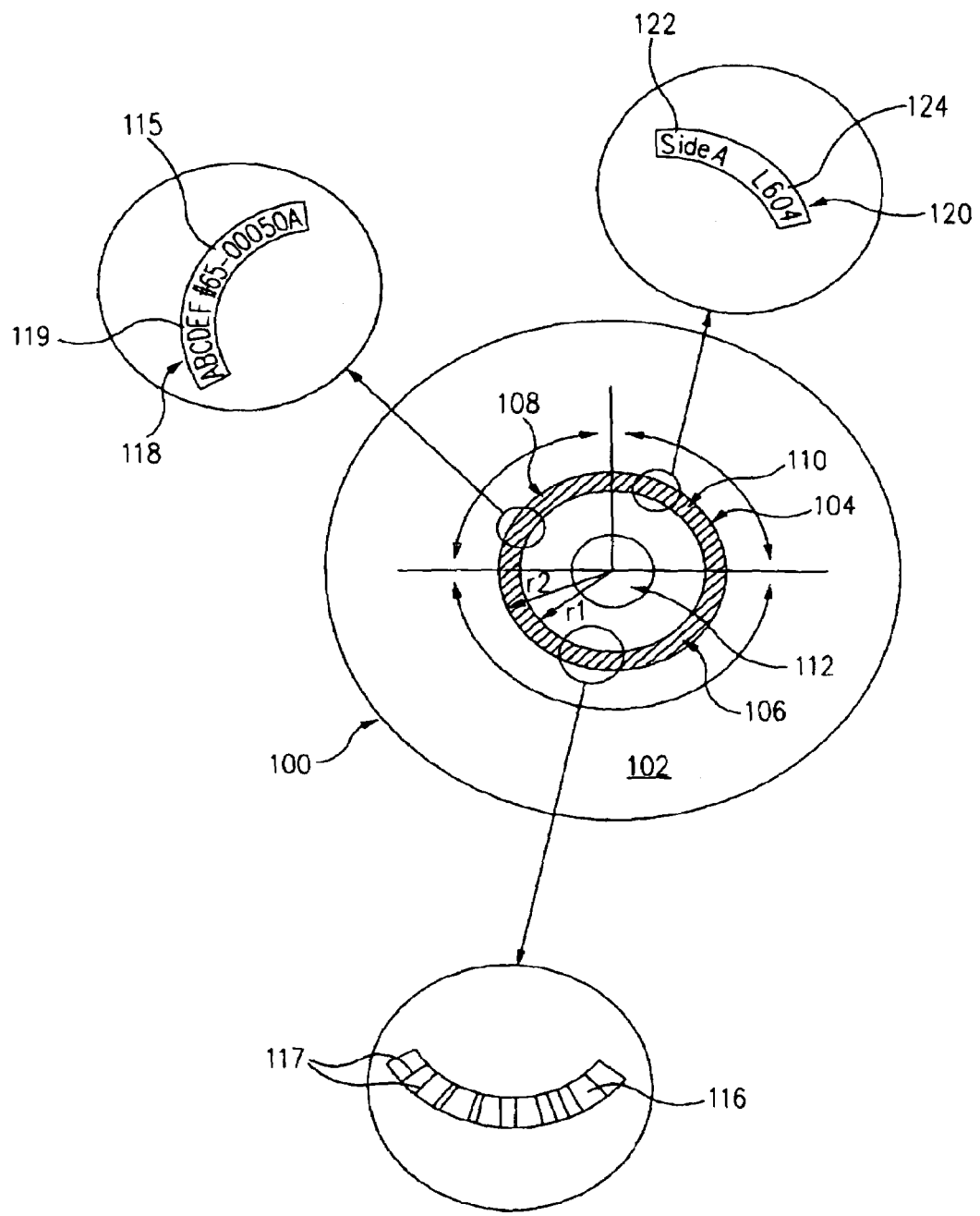
FIG. 1 is a top plan view of an optical disk, according to one embodiment of the present invention.

In read/write disks, data is stored in the form of marks, usually in the grooves of the disk. Such marks can typically be a change in the nature of the material, such as in the structure of the material. Storing, or writing, data onto the disk requires energy, typically in the form of laser light, to form the physical marks in the material. Typically, the marks are written on groove portions of the disk. In the case of read only discs, data may be embossed or stamped in the form of pits or bumps in the surface of the disk. Disks can be read-only, with pits or bumps, writeable with grooves and lands, or may have read-only regions and writeable regions. Additional details regarding such disks are disclosed in U.S. patent application Ser. Nos. 09/854,333 and 09/764,042, the disclosures of which are incorporated herein by reference in their respective entireties.

The pits and grooves may be formed on the disk using a father stamper, which has features (i.e., bumps and lands) that are mirror images or opposite polarity of the pits and grooves. Father stampers are formed, beginning with a glass master disk. Photoresist is deposited on the glass master disk. After being coated with photoresist, the master is placed on an air-bearing spindle. A master bench laser exposes selected portions of the photoresist to create the desired pattern of pits and/or grooves. After the photoresist is exposed and developed, which washes away the exposed resist to leave the surface topology in the desired mode for when the disk is finally molded, the master disk is plated with nickel in a process known as electroforming. The nickel mold, known as the father stamper, is separated from the photoresist and master disk. The father stamper has features that are mirror images of the features cut by the laser. Using polycarbonate, for example, in an injection molding process creates the disk with pits and recessed grooves as originally cut by the laser.

Optionally, a mother stamper, a stamper that is the topological inverse or mirror image of the father stamper, may replace grooves with lands and pits with bumps in the completed disk. One such mother stamper is disclosed in U.S. patent application Ser. No. 10/056,927, the disclosure of which is hereby incorporated by reference in its entirety.

The grooves are typically formed in a wobble that generates a sinusoidal signal used to control the rotational speed of the disk and to generate a clock signal. For example, U.S. Pat. Nos. 4,972,410 and 5,682,365 to Carasso et al. describes disks with wobbles and are incorporated by reference in their entirety. The grooves may also contain high-frequency wobble marks within the wobble which can be used to indicate other information, such as the addresses of the physical sectors. Details are disclosed in commonly-owned U.S. patent application Ser. No. 09/542,681, entitled "Structure and Method for Storing Data on Optical Discs", which is incorporated by reference in its entirety. In reading the disk, features cut by the original mastering laser are tracked. Thus, because disks created using a father stamper process have originally-cut features along the grooves, tracking is on the wobbled grooves, and information is written in the grooves.

Reading or playing back the information is typically achieved by the optical reader transmitting a light beam onto the information layer and detecting the characteristics of the reflected light. In the case of what are called front or first surface disks, the information surface is the first surface that the read or write laser impinges. To the contrary, in second surface disks, the information surface is the second surface that the read or write laser impinges, the first surface being the surface of the substrate. The stored information is read by detecting the absence or presence of the marks in the grooves of the coating layer, such as by an optical head or reader. This then allows the stored information to be played back. One detection principle for recorded information in such disks is often the change in the refractive indices of the coating layer, another principle in such disks is the detection of the change in the polarization axis of the light. Commonly, however, the change in optical intensity resulting from optical phase shift is detected.

Reading or playing back the information in second surface disks is typically achieved by the optical reader transmitting a light beam through the substrate of the disk and onto the information layer (i.e., the groove and pits) and reflecting the light beam back through the substrate. The substrate is typically a clear plastic material on which the information layer is formed. Because the light is incident on two surfaces (the substrate surface and the information surface), this type of disk can be referred to as a second-surface or substrate-incident disk or media.

The relatively thick and transparent substrate of second-surface optical media makes read-only or read/write operations relatively insensitive to dust particles, scratches and the like since they can be located more than approximately 500 wavelengths from the information layer and hence are defocused. On the other hand, the second-surface optical medium can be relatively sensitive to various opto-mechanical variations. For example, common opto-mechanical variations include tilt of the substrate relative to the optical axis, substrate thickness variations, and/or substrate birefringence.

These variations give rise to optical aberrations which degrade system performance arising from the presence of the thick transparent layer and which can, at least theoretically, be partially compensated for by using a suitable optical path design. Such an optical path typically can only provide compensation for a single, pre-defined thickness of the layer. Because there are likely to be variations in the thickness or other properties of the transparent layer, such compensation may be less than desired at some locations of the medium.

Another drawback associated with second-surface optical media is that the optical requirements of such media are substantially inconsistent with the miniaturization of the disk drive and optical components for such media. As will be appreciated, a longer working distance (distance between the objective lens and the information content portions) is required for an optical system that will read information from or write information onto second-surface media. This is due to the relatively thick transparent layer through which the radiation must pass to access the recording layer. To provide the longer working distance, larger optical components (e.g., objective lenses) are required.

FIG. 1 illustrates an optical disk 100 having a first side 102 and a second side (not shown). In one embodiment, the optical disk 100 comprises a hybrid, first surface optical disk having prerecorded and recordable portions and an overall diameter of less than about 50 millimeters. In a specific embodiment, the optical disk 100 has an overall diameter of about 32 millimeters.

The optical disk 100 includes a graphics ring 104. The graphics ring 104 comprises an annular region of the first side 102 between a first radius r1 and a second radius r2. The second side (not shown) of the optical disk 100 may also include a graphics ring 104. In one embodiment, the first radius r1 is about 5.5 millimeters and the second radius r2 is about 6.3 millimeters.

Moreover, the optical disk 100 includes a through hole 112 located at approximately the center of the optical disk 100. As those skilled in the art will appreciate, the through hole 112 may be adapted with at least one hub (not shown) to facilitate spinning the optical disk 100 with disk spinning equipment, such as a disk drive (not shown).

The graphics ring 104 includes a first portion 106, a second portion 108, and a third portion 110. Machine readable code, such as bar code information 116, is disposed within the first portion 106 of the graphics ring 104. Human readable alphanumeric characters 118 are disposed within the second portion 108 of the graphics ring 104. Human readable alphanumeric characters 120 are disposed within the third portion 110 of the graphics ring 104.

The first portion 106 of the graphics ring 104 comprises about one half, or about 180 degrees, of the graphics ring 104. The second and third portions 108 and 110 each comprise about one quarter, or about 90 degrees, of the graphics ring 104.

In one embodiment, the bar code information 116 is written in the first portion 106 of the graphics ring with a series of low reflectance stripes 117 arranged in a circumferential direction and extending radially substantially between the first radius r1 and the second radius r2. A disk drive (not shown), may read the bar code information 116 using the optical head of the disk drive and an active focus servo to focus the bar code information 116. Pursuant to one embodiment, the bar code information 116 is formatted in a manner similar to the NBCA (New Burst Cutting Area) format used with DVD-type disks. Additional details regarding DVD-type disks are disclosed in the DVD Specification V.1.0 and are available from the DVD Forum, www.dvdforum.org.

As discussed in more detail below, the bar code information 116 contains format information, which the disk drive, or other device, reads to determine the format of the electrically encoded information on the optical disk 100. In addition, the bar code information 116 contains information that identifies when and where the master that produced the optical disk 100 was manufactured. Some of the bar code information 116 may be defined on the master tape that is generated in the pre-mastering process. The formatter used to master the disk may also generate some of the bar code information 116 automatically at the time the master is being manufactured and will also embed in the bar code information 116. Additional details regarding the bar code information 116 are discussed below with reference to FIGS. 2–5.

A disk drive (not shown) may read the bar code information 116 of an inserted optical disk 100 by spinning the optical disk 100 and advancing an optical head (not shown) to a predetermined location. The predetermined location corresponds with the radial position of the bar code information 116 on the optical disk 100. The disk drive may include a mechanical stop positioned to stop advancement of the optical head when the optical head arrives at the predetermined location. With the optical head thus positioned, the optical head may read the bar code information 116 using an active focus servo to focus the bar code information 116. Tracking, or the use of an active tracking servo, is not required to read information within the graphics ring 104.

Other devices, such as bar code readers and optical disk scanners may also read the bar code information 116. These devices, however, may or may not need to spin the optical disk 100 to read the bar code information 116.

The alphanumeric characters 118 may comprise master tape part number information, master cut number information, or both. In one embodiment, master tape part number information 115 includes an eight character alpha-numeric field, preceded by a pound character ("#"). The contents of this eight character alpha-numeric field are included on the master tape and are read by the formatter at the time the master is made. The master cut number information 119, in one embodiment, is a six character alpha-numeric field, the contents of which are entered by an operator at the time the master is made. The alphanumeric characters 118 may reference actual content on the master tape.

In one embodiment, the alphanumeric characters 118 are about 0.8 millimeter tall and are substantially centered in the second portion 108 of the annular ring 104 between the first and third portions 106 and 110 and between the first and second radii r1 and r2. Of course, the height of the alphanumeric characters 118 and the position of the alphanumeric characters within the second portion 118 may vary.

The alphanumeric characters 120 are disposed in the third portion 110 of the graphics ring 104 and may include side identification information 122 and source identification information 124. The purpose of the side identification information 122 is to permit human operators to be able to easily distinguish between the two sides of the optical disk 100 (i.e., first side 102 and the opposing second side) before inserting the optical disk 100 into a cartridge during the manufacturing process. Machine vision equipment with character recognition functionality may also read the alphanumeric characters 120.

In one embodiment, the side identification information 122 comprises language such as "side A" to identify a side of the optical disk 100. Pursuant to another embodiment, a trademark, a logo, or other set of alphanumeric characters or graphic may be employed for this purpose.

The source identification information 124 may comprise a four character master disk source identifier, wherein each formatter has a source identifier associated therewith, which is hard coded into the associated formatter, such as by the formatter manufacturer. This can, for example, permit identification of the maker of the master disk itself after it has been recorded.

In one embodiment, the alphanumeric characters 120 are 0.8 millimeter tall and are substantially centered in the third portion 110 of the annular ring 104. Of course, the height of the alphanumeric characters 120 and the position of the alphanumeric characters 120 within the third portion 110 may vary.

Pursuant to one embodiment, the second side (not shown) of the optical disk 100 has a ring (not shown) configured identical to the ring 104, but having information pertaining to the second side.

The bar code information 116 and the alphanumeric characters 118, 120 may be mastered into the optical disk without the need for separate processes, such as laser etching or ink jet marking. Details regarding the mastering of the bar code information 116 are described below with reference to FIG. 2.

Figures 2, 3:
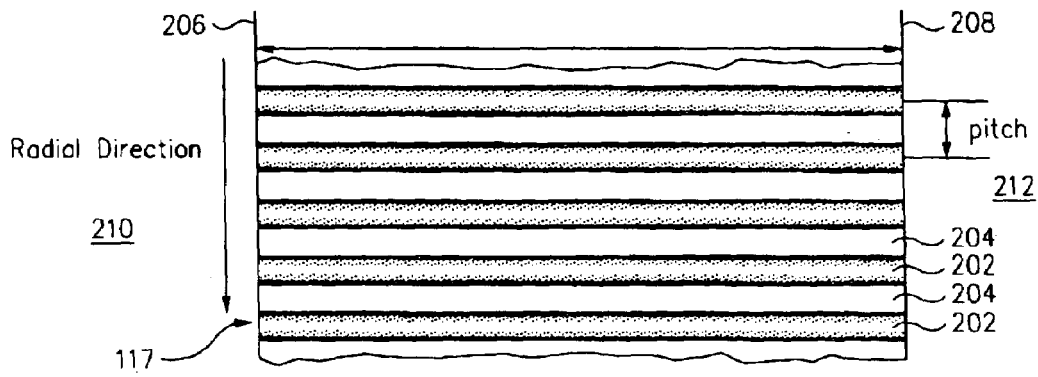
FIG. 2 illustrates a section of a FIG. 1 low reflectivity stripe.
FIG. 3 illustrates the data structure for the bar code information of FIG. 1.

FIG. 2 illustrates a section of a single low reflectance stripe 117 of the bar code information 116 of FIG. 1. Data encoded for the bar code information 116, in one embodiment, is encoded by phase encoding where a ZERO bit is represented by two channel bits set to ONE ZERO and a ONE bit is represented two channel bits set to ZERO ONE. The sequence of the channel bits may be modulated according to conventional Return-to-Zero (RZ) modulation techniques.

Each of the low reflectance stripes 117 is mastered as short sections of "lands" 202 and "grooves" 204 between opposing edges 206 and 208. The lands 202 are raised portions of the optical disk 100 that are closest to the light beam that reads data from the optical disk 100. The grooves 204 separate the lands 202 and comprise recessed regions of the optical disk 100 that are farther from the light beam than the lands 202. Each land 202 and groove 204 may have a dimension in the radial direction of about 400 nm. Each land 202 and groove 204 may have a dimension in the circumferential direction of about 7.4 um between the opposing edges 206 and 208. Each groove 204 may have a depth of about 85 nm relative to the adjacent lands 202. In one embodiment, the distance between adjacent lands about 0.74 um, this distance may be referred to as the "pitch". The overall dimensions of each low reflectance stripe 117 may be about 0.8–1 mm in the radial direction and about 7.4 um in the circumferential direction.

Accordingly, each low reflectance stripe 117 comprises a series of alternating lands 202 and grooves 204. High reflectance regions 210 and 212 are disposed on adjacent circumferential sides of each low reflectance stripe 117 and have an elevation approximately equal to that of the grooves 204. The high reflectance regions 210 and 212 comprise flat, or mirror, areas. Edges 206 and 208 separate the low reflectance stripe 117 from the high reflectance regions 210 and 212, respectively.

When a low reflectance stripe 117 is read, a focused laser spot from an optical pickup head is diffracted by the areas with lands and grooves. Higher orders of diffracted light that reflect from the optical disk tend to not pass through an aperture of an objective lens, which receives the reflected light. Hence, when the focused laser spot is over an area with lands and grooves (i.e., a low reflectance stripe 117), the total return light that enters the objective lens is less than when the focused laser spot is over a flat area (i.e., a high reflectance region 210) of the disk that does not diffract as much light.

Thus, to the objective lens, the land and groove areas appear as low reflectivity areas, or stripes compared to flat, or mirror, areas of the optical disk between the land and groove areas. In some embodiments, the size of the spot is about the same as the track pitch. While the amount of reflected light differs when the focused laser spot is over a land or a groove, the amount of reflected light associated with a flat region is substantially greater than that of a land or a groove.

Further, the optical disk may have some radial runout. This radial runout may result from differences between a first center point of the disk defined by the mastering system during the mastering process and a second center point defined by the placement of the hub and spindle motor of the disk drive. Due to mechanical tolerances, the first and second centers are rarely exactly the same and, therefore, some radial runout typically results.

In some embodiments, in which the focused laser spot is small compared to the track pitch, the radial runout helps to make sure the focused laser spot crosses lands and grooves in the low reflectance stripe area. Pursuant to these embodiments, the focused laser spot may be sufficiently small that each land and grove area appears to the objective lens as a flat area. However, with some radial runout, the spot will have to transition between land and groove areas. This transition will cause light to be diffracted as described above.

A low pass filter is applied to the detected signal, which averages the light detected from the land and groove areas with the apparent flat, or mirror, areas between the land and groove areas. This low pass filtering produces a signal from the low reflectance stripe that is less than the signal from a flat, or mirror, area. Hence, after low pass filtering, the net effect of the land and groove areas is a low reflectance stripe.

The signal levels corresponding to a high and low reflectance are $I_{bh}$ and $I_{bl}$, respectively, as measured relative to a zero light level. In one embodiment, the $I_{bh}$ and $I_{bl}$ signal levels meet the following:

$$(I_{bh}-I_{bl})/I_{bh} > 0.25.$$

In one embodiment, the channel bit length of a bar code channel bit, expressed in microseconds, is about 5.10 microseconds at a reference velocity of 2.9 meters/second.

An edge position of the bar code signal is the position at which the bar code signal crosses the mean level between $I_{bh}$ and $I_{bl}$. The length of the pulses corresponding to the low-reflectance strip may be 2.55 microseconds±0.50 microseconds.

The deviation of the time interval between successive leading edges, in one embodiment, is less than about 0.75 microseconds. Similarly, the deviation of the time interval between the centers of successive pulses is less than about 0.75 microseconds. The center of a pulse is the middle point between the leading edge and the trailing edge.

FIG. 3 illustrates the data structure for the bar code information 116. As shown, the bar code information 116 includes a PLL (Phase Locked Loop) sync field 302, a preamble 304, a data field 306, and a postamble 308, arranged in series.

The PLL sync field 302 may comprise two bytes, which may be set to FFh as a default and encoded by Return-to-Zero (RZ) modulation. The bytes of the PLL sync field 302 immediately precede the sync byte $SB_{BAR}$ of the preamble 304.

The preamble 304 of the bar code information 116 may comprise four bytes $PR_0$–$PR_3$ set to (00) preceded by the first sync byte $SB_{BAR}$. The preamble 304 signifies the beginning of the bar code information 116 and may comprise four bytes set to zero.

The data field 306 includes information bytes 310, error detection code (EDC) bytes 312, and error correction code (ECC) bytes 314. In one embodiment, the information bytes 310 comprise 28 bytes ($I_0$, $I_1$, . . . $I_{27}$), which may be arranged and analyzed by the reading device as seven rows. A resync byte $RS_{BARi}$ is inserted before each 4-byte row of $I_i$ bytes, changing every four rows.

The following describes an example embodiment of the specific contents of the various information bytes 310. Byte $I_0$ is the disk format major identifier. The content of the byte $I_0$ may be included in the master tape and read by the formatter at the time of mastering.

Bytes $I_1$ and $I_2$ contain the serial number, or other identifier, of the formatter that produced the master from which the optical disk 100 resulted. The formatter manufacturer may hard code the contents of the bytes $I_1$ and $I_2$ into the formatter.

Byte $I_3$ contains the identification number of the LBR (Laser Beam Recorder) that produced the master. The contents of the byte $I_3$ are entered at the time of mastering.

Bytes $I_4$ and $I_5$ contain identification data corresponding to the site that produced the pre-mastered tape. The contents of the bytes $I_4$ and $I_5$ are included in the master tape and read by the formatter at the time of mastering.

Bytes $I_6$ and $I_7$ contain identification data corresponding to the site that produced the master from which the optical disk 100 resulted. The formatter manufacturer may hard code the contents of the bytes $I_6$ and $I_7$ into the formatter.

Figures 4, 5:
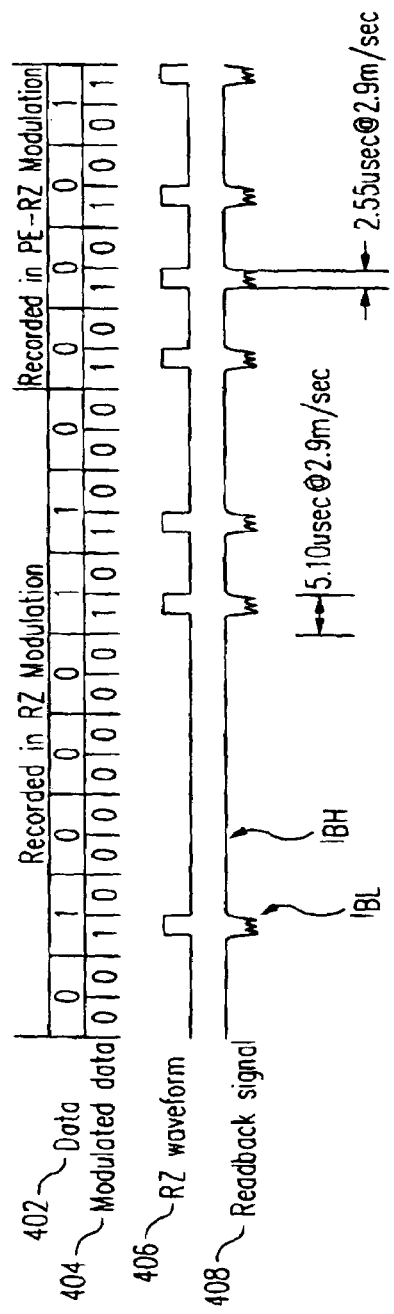
FIG. 4 illustrates the contents of example bar code information of FIG. 1.
FIG. 5 illustrates the contents of an example time and date stamp included in the bar code information of FIG. 1.

Bytes $I_8$–$I_{11}$ contain a time and date stamp of when the master was produced that mastered the optical disk 100. The formatter may automatically generate these bytes at the time of mastering. FIG. 5, as discussed below, illustrates example time stamp data.

Bytes $I_{12}$–$I_{17}$ contain a side content identifier, which may comprise a unique number, such as a serial number, corresponding to the content of the master. The side content identifier may be assigned at the time of pre-mastering and is included in the master tape and read by the formatter at the time of mastering.

Bytes $I_{18}$–$I_{19}$ are reserved and may be set to FFh as a default.

Bytes $I_{20}$–$I_{24}$ contain a 40-bit word whose contents may vary, depending on the particular application.

Bytes $I_{25}$–$I_{26}$ are reserved and may be set to FFh as a default.

Byte $I_{27}$ is the disk format minor identifier. Thus, the format of the disk may be identified from the bytes $I_0$ and $I_{27}$ taken together. The content of the byte $I_{27}$ may be included in the master tape and read by the formatter at the time of mastering.

This specific designation for the various bytes is one example of the specific contents of the various information bytes 310. Of course, the specific contents and arrangement of the information bytes 310 may vary.

The error detection code bytes 312 are used for the detection of errors in the information bytes 310 and may comprise four bytes ($D_0$, $D_1$, $D_2$, and $D_3$). The error detection code bytes 312 are preceded by a resync byte $RS_{BAR2}$.

Regarding the error detection code 312, the bytes $D_0$ to $D_3$ follow the information bytes $I_0$ and $I_{27}$. Polynomials $EDC_{BAR}(x)$ and $I_{BAR}(X)$ are as follows.

$$EDC_{BAR}(x) = \sum_{i=0}^{31} b_i x^i$$

$$I_{BAR}(x) = \sum_{i=32}^{255} b_i x^i$$

where i is the bit number starting with zero and counted from the least significant bit of the last byte of byte $D_3$, to the most significant bit of the first byte of information data, $I_0$. The value of the i-th bit is represented by $b_i$.

A Reed-Solomon ECC code with a 4-way interleave is applied to the information data and the error detection code 312. Polynomials $R_{BARj}(x)$ and $I_{BARj}(x)$ shall be as follows.

$$R_{BARj}(x) = \sum_{i=0}^{3} C_{j,i} x^{3-i}$$

$$I_{BARj}(x) = \sum_{i=0}^{6} I_{(j+4i)} x^{51-i} + D_j x^{44}$$

where $I_m$ represents the m-th information data byte and $D_k$ represents the k-th $EDC_{BAR}$ byte.

The error correction code bytes 314 are used for the correction of errors in the information bytes 310. Errors in the reading of the information bytes may arise as a result of dust disposed on the first side 102 (FIG. 1) of the optical disk 100, among other causes. Such dust may impede the accurate reading of the information bytes 310.

In particular, the error correction code bytes 314 may comprise sixteen bytes (Ci,j) arranged in four rows. Each row of error correction code bytes 314 is preceded by a resync byte.

To calculate the bytes (Ci,j), the concept of virtual information data is introduced. Virtual information comprises the 28 bytes of information data, $I_0$ to $I_{27}$, concatenated with 40 rows, or 160 bytes, of virtual information data with implicit values of zero. This would be the same information data populating 47 rows instead of 7 rows where the extra 40 rows are all zero. Polynomial $VI_{BAR}(x)$ is defined as follows.

$$VI_{BAR}(x) = \sum_{i=32}^{1535} b_i x^i$$

where i is the bit number in which bit numbers 32 through 1311 are bits of the virtual information and 1312 through 1535 are counted starting at the least significant bit of the last byte of the information data, $I_{27}$, to the most significant bit of the first byte of the information data, $I_0$. The value of the i-th is represented by $b_i$. For values of i from 32 through 1311, the value, $b_i$, is zero.

The polynomial D(x) shall be calculated as follows.

$$D(x) = VI_{BAR}(x) \bmod G(x)$$

where $G(x) = x^{32} + x^{31} + x^4 + 1$.

To calculate $R_{BARj}$, the concept of virtual information data, the virtual information is again used. Polynomial $I_{BARj}(x)$ shall be defined as follows.

$$VI_{BARj}(x) = \sum_{i=0}^{46} I_{(j+4i)} x^{51-i} + D_j x^4$$

where $VI_m$ represents the m-th information data byte and $D_k$ represents the k-th $EDC_{BAR}$ byte.

The polynomial $r_{BARj}(x)$ shall be calculated as follows.

$$R_{BARj}(x) = VI_{BARj}(x) \bmod G_{pBAR}(x)$$

$$G_{pBAR}(x) = \prod_{k=0}^{3} (x + a^k)$$

where α is the primitive root of the polynomial $Gp(x) = x^8 + x^4 + x^3 + x^2 + 1$.

The Bar Code Sync byte $SB_{BAR}$ and the Resync bytes $RS_{BARi}$ may have the bit patterns shown in the table below:

| Sync Byte and Resync Bytes | Bit Patterns Fixed Pattern Channel Bits | | | | | | | | Sync Code 4 data bits | | | |
|---|---|---|---|---|---|---|---|---|---|---|---|---|
| | Ch15 | Ch14 | Ch13 | Ch12 | Ch11 | Ch10 | Ch9 | Ch8 | b3 | b2 | b1 | b0 |
| $SB_{BAR}$ | 0 | 1 | 0 | 0 | 0 | 1 | 1 | 0 | 0 | 0 | 0 | 0 |
| $RS_{BAR1}$ | 0 | 1 | 0 | 0 | 0 | 1 | 1 | 0 | 0 | 0 | 0 | 1 |
| $RS_{BAR2}$ | 0 | 1 | 0 | 0 | 0 | 1 | 1 | 0 | 0 | 0 | 1 | 0 |
| $RS_{BAR13}$ | 0 | 1 | 0 | 0 | 0 | 1 | 1 | 0 | 1 | 1 | 0 | 1 |
| $RS_{BAR14}$ | 0 | 1 | 0 | 0 | 0 | 1 | 1 | 0 | 1 | 1 | 1 | 0 |
| $RS_{BAR15}$ | 0 | 1 | 0 | 0 | 0 | 1 | 1 | 0 | 1 | 1 | 1 | 1 |
| | Recorded in RZ Modulation | | | | | | | | Recorded in PE-RZ Modulation | | | |

Lastly, the postamble 308 may comprise a row of four bytes ($PO_0$, $PO_1$, $PO_2$, and $PO_3$) set to (55) and preceded by a resync byte $RS_{BAR14}$ and followed by a resync byte $RS_{BAR15}$.

FIG. 4 illustrates the contents of example bar code information 116. In particular, the data 402, the modulated data 404, the RZ waveform 406, and the readback signal 408 are illustrated in an aligned fashion. The readback signal 408 is shown with reference to $I_{bl}$ and $I_{bh}$ portions. The modulated data 404 is shown be modulated at 5.10 microseconds at 2.9 meters/second and the readback signal at 2.55 microseconds at 2.9 meters/second.

FIG. 5 illustrates example time stamp data in accordance with one embodiment of the present invention. As shown, the byte $I_8$ and the most significant nibble (MSN) of the byte $I_9$ of the information bytes 310 (FIG. 3) represent the Julian day the master was created. The least significant nibble (LSN) of the byte $I_9$ and the MSN of byte $I_{10}$ specify the year the master was created. The LSN of byte $I_{10}$ and the MSN of the byte $I_{11}$ specify the hour the master was created. The LSN of the byte $I_{11}$ specifies the master count. Thus, the example shown in FIG. 5 is for a master that was generated on the 128$^{th}$ day of the year 2001, during the 14$^{th}$ hour of the day, and it was the first master produced that hour.

The above detailed description and accompanying drawings are provided to illustrate specific embodiments of the present invention and are not intended to be limiting. Numerous modifications and variations within the scope of the present invention are possible. The present invention is particularly pointed out and distinctly claimed in the following claims.

What is claimed is:

1. An optical disk comprising:
a substrate stamped with features that define
machine readable code disposed in a circumferential direction within a first portion of an annular region, the machine readable code including a plurality of bars each extending in a radial direction, wherein the machine readable code comprises a set of low reflectance stripes, each low reflectance stripe comprising a series of lands and grooves.

2. The optical disk of claim 1, further comprising:
a first set of alphanumeric characters disposed in a circumferential direction within a second portion of the annular region, the first set of alphanumeric characters indicating the side of the optical disk;
a second set of alphanumeric characters disposed in a circumferential direction within a third portion of the annular region.

3. The optical disk of claim 2, wherein the second set of alphanumeric characters comprises master tape identifying information.

4. The optical disk of claim 2, wherein the second set of alphanumeric characters comprises master cut identifying information.

5. The optical disk of claim 1, wherein the diameter of the optical disk is less than about 50 millimeters.

6. The optical disk of claim 1, wherein the machine readable code further comprises error correction code.

7. The optical disk of claim 1, wherein the machine readable code further comprises error detection code.

8. The optical disk of claim 1, wherein the machine readable code further comprises date information.

9. The optical disk of claim 1, wherein the machine readable code further comprises information containing the date and time of mastering.

10. The optical disk of claim 1, wherein the machine readable code further comprises information identifying a site where the disk was mastered.

11. The optical disk of claim 1, wherein the machine readable code further comprises information identifying a formatter used in manufacturing the disk.

12. The optical disk of claim 1, wherein the machine readable code further comprises information identifying a format of the disk.

13. An optical disk comprising:
a substrate stamped with features that define
bar code information disposed in a circumferential direction within a first portion of an annular region, the bar code information including a plurality of bars each extending in a radial direction; the bar code information comprising error correction code;
a first set of alphanumeric characters disposed in a circumferential direction within a second portion of the annular region, the first set of alphanumeric characters indicating the side of the optical disk; and
a second set of alphanumeric characters disposed in a circumferential direction within a third portion or of the annular region, wherein the first portion comprises about one half of the annular region, the second portion comprises about one quarter of the annular region, and the third portion comprises about one quarter of the annular region.

14. The optical disk of claim 13, wherein the second set of alphanumeric characters comprises master tape identifying information.

15. The optical disk of claim 13, wherein the second set of alphanumeric characters comprises master cut identifying information.

16. The optical disk of claim 13, wherein the diameter of the optical disk is less than about 50 millimeters.

17. The optical disk of claim 13, wherein the machine readable code further comprises error detection code.

18. The optical disk of claim 13, wherein the machine readable code further comprises date information.

19. The optical disk of claim 13, wherein the machine readable code further comprises information containing the date and time of mastering the disk.

20. The optical disk of claim 13, wherein the machine readable code further comprises information identifying a site where the disk was mastered.

21. The optical disk of claim 13, wherein the machine readable code further comprises information identifying a formatter used in manufacturing the disk.

22. The apparatus of claim 13, wherein the machine readable code further comprises information identifying a format of the disk.

23. An optical disk comprising:
a substrate stamped with features that define
machine readable code disposed in a circumferential direction within a first portion of an annular region, the machine readable code including a plurality of bars each extending in a radial direction;
the machine readable code including error detection code, error correction code, date information, manufacturing site information, and information identifying the format of the optical disk;
a first set of alphanumeric characters disposed in a circumferential direction within a second portion of the annular region, the first set of alphanumeric characters indicating the side of the optical disk;
a second set of alphanumeric characters disposed in a circumferential direction within a third portion of the annular region the second set of alphanumeric characters comprises master tape and master cut identifying information;
the first portion comprising about one half of the annular region, the second portion comprising about one quarter of the annular region, and the third portion comprising about one quarter of the annular region.

* * * * *